(12) United States Patent
Salti et al.

(10) Patent No.: US 10,936,917 B2
(45) Date of Patent: Mar. 2, 2021

(54) SYSTEM AND METHOD FOR DETECTING AND CLASSIFYING RECURRENT STOPS OF A VEHICLE FLEET

(71) Applicant: VERIZON CONNECT IRELAND LIMITED, Dublin (IE)

(72) Inventors: Samuele Salti, Prato (IT); Francesco Sambo, Padua (IT); Leonardo Taccari, Florence (IT); Luca Bravi, Scandicci (IT); Alessandro Lori, Florence (IT)

(73) Assignee: Verizon Connect Ireland Limited, Dublin (IE)

( * ) Notice: Subject to any disclaimer, the term of this patent is extended or adjusted under 35 U.S.C. 154(b) by 0 days.

(21) Appl. No.: 15/545,951

(22) PCT Filed: Jan. 31, 2017

(86) PCT No.: PCT/EP2017/052053
§ 371 (c)(1),
(2) Date: Jul. 24, 2017

(87) PCT Pub. No.: WO2018/141368
PCT Pub. Date: Aug. 9, 2018

(65) Prior Publication Data
US 2019/0347513 A1 Nov. 14, 2019

(51) Int. Cl.
*G06K 9/62* (2006.01)
*G06N 20/20* (2019.01)
(Continued)

(52) U.S. Cl.
CPC .......... *G06K 9/628* (2013.01); *G06K 9/6217* (2013.01); *G06N 20/20* (2019.01); *G06Q 30/0205* (2013.01)

(58) Field of Classification Search
CPC ...... G06K 9/628; G06K 9/6217; G06N 20/20; G06Q 30/0205; G06Q 10/0833; G06Q 10/0838; G06Q 10/063
See application file for complete search history.

(56) References Cited

U.S. PATENT DOCUMENTS 6,232,915 B1   5/2001 Dean et al.
7,363,126 B1 * 4/2008 Zhong ................ G01C 21/3484
                                              340/992

(Continued)

FOREIGN PATENT DOCUMENTS

WO    2015/139709    9/2015

OTHER PUBLICATIONS

Andrew Karpathy, CS231n Convolutional Neural Networks for Visual Recognition, Feb. 12, 2015, 23 pages.

(Continued)

*Primary Examiner* — Marthe Y Marc-Coleman

(57) ABSTRACT

A method and system for identifying recurrent stops of a vehicle fleet having a plurality of vehicles. The method comprises retrieving historical GPS tracks of the vehicle fleet over a period of time; detecting stops made by the vehicle fleet along travelled routes that are associated with the historical GPS tracks; constructing a coverage area that covers the travelled routes; discretizing the coverage area into a plurality of cells; determining whether a cell is a recurrent stop based on a fleet stay period associated with that cell; and classifying a determined recurrent stop into a plurality of categories.

20 Claims, 9 Drawing Sheets

(51) Int. Cl.
    *G06Q 30/02*     (2012.01)
    *G06Q 10/08*     (2012.01)
    *G06Q 10/06*     (2012.01)

(56) References Cited

U.S. PATENT DOCUMENTS

| | | |
|---|---|---|
| 9,313,616 B2 | 4/2016 | Mitchell et al. |
| 2010/0203902 A1 | 8/2010 | Wachter et al. |
| 2013/0218445 A1* | 8/2013 | Basir ............... G08G 1/096811 |
| | | 701/117 |
| 2013/0304347 A1 | 11/2013 | Davidson |
| 2015/0077276 A1* | 3/2015 | Mitchell .............. G06Q 10/083 |
| | | 340/995.1 |
| 2015/0161827 A1* | 6/2015 | Getchius .................. G08G 1/20 |
| | | 701/519 |

OTHER PUBLICATIONS

Krizhevsky et al., "Imagenet Classification with deep convolutional neural networks", Advance in neural information processing systems, pp. 1097-1105, 2012.

He et al., "Delving deep into rectifiers: Surpassing human level performance on imagenet classification", Proceedings of the IEEE International Conference on Computer Vision, pp. 1026-1034, 2015.

\* cited by examiner dentifying frequent stops of vehicle fleets still rely on operators to hand pick certain criteria for identifying recurrent stops and adjust those criteria for a new fleet or when the travel pattern of an old fleet changes.

SYSTEM AND METHOD FOR DETECTING AND CLASSIFYING RECURRENT STOPS OF A VEHICLE FLEET

RELATED APPLICATION

This application claims priority to PCT Application No. PCT/EP2017/052053, filed Jan. 31, 2017, which is incorporated herein by reference.

RELATED APPLICATIONS

The present application generally relates to PCT Application No. PCT/EP2016/079662 to Fleetmatics Development Limited, titled "System and Method for Deriving Operation Information of a Fleet and Analyzing the same," filed on Dec. 2, 2016, the entirety of which is incorporated herein by reference. The present application also relates to PCT Application No. PCT/EP2016/079625 to Fleetmatics Development Limited, titled "System and Method for Determining a Vehicle Classification from GPS Tracks," filed on Dec. 2, 2016, the entirety of which is incorporated herein by reference.

FIELD OF THE INVENTION

The present application generally relates to a system and method for detecting and classifying recurrent stops of a vehicle fleet. More specifically, the system and method are capable of implementing a machine-learning algorithm that detects and classifies recurrent stops of vehicle fleets from historical GPS tracks and satellite images with little or no human interactions during the prediction.

BACKGROUND

On-board tracking devices, such as cell phones, navigation devices, and GPS devices, have been widely used to monitor positions of vehicles in real-time. These on-board tracking devices also transmit position data, such as GPS tracks, to a data repository, such as a central management server. These position data can provide invaluable insights to the driving behavior of drivers, vehicle operation status and maintenance, fleet scheduling, efficiency of route planning, compliance to regulatory requirements, and unnecessary costs related to vehicles, such as idling, overtime, personal use, etc.

Recurrent stops, also known as hot-spots, of a vehicle fleet represent those locations that are often visited by vehicles of the fleet. These recurrent stops may be the administrative office of the fleet, a service state, an employee home, a warehouse or a frequent customer. As the recurrent stops represent significant locations, the number and location of these recurrent stops will often dictate routes to be travelled by the vehicles and have major impact on fleet operations. Knowing this, several applications and patents in the field of vehicle fleet management have described certain methods to identify recurrent stops from GPS tracks. For example, U.S. Pat. No. 9,313,616 discloses a method that identifies and categorizes frequent stops of a vehicle fleet based on the number of stops in a pre-determined location. U.S. application Ser. No. 09/386,757 discloses a method that identifies cluster of activities based on frequency of activities occurring within a defined distance from each other. U.S. Pre-Grant Publication No. 20100203902 describes a method that determines the normal movement patterns of a mobile user device. However, these traditional methods of identifying frequent stops of vehicle fleets still rely on operators to hand pick certain criteria for identifying recurrent stops and adjust those criteria for a new fleet or when the travel pattern of an old fleet changes.

SUMMARY OF THE INVENTION

Thus, there is a long felt need in the field of vehicle fleet management to have a system and method that is capable of automatically identifying recurrent stops from the GPS data with minimum human interventions. The system and method of the present application provides a solution to the above challenge by implementing a machine-learning algorithm to identify and classify recurrent stops of a vehicle fleet. An operator only needs to train the machine-learning algorithm with a training dataset, which would allow the machine-learning algorithm to identify and classify recurrent stops in an unseen instance in a fully automated manner. The machine-learning algorithm is capable of selecting a subset of the features for identification and classification. The system and method of the present application are capable of automatically identifying recurrent stops from GPS tracks, satellite images, or the combination thereof.

An aspect of the present application is directed to a method for identifying recurrent stops of a vehicle fleet having a plurality of vehicles. The method comprises retrieving historical GPS tracks of the vehicle fleet over a period of time; detecting stops made by the vehicle fleet along travelled routes that are associated with the historical GPS tracks; constructing a coverage area that covers the travelled routes; discretizing the coverage area into a plurality of cells; determining whether a cell is a recurrent stop based on a fleet stay period associated with that cell; and classifying a determined recurrent stop into a plurality of categories.

According to various embodiments, the period of time includes a plurality of work shifts. The cell has a size of about 100 meters. The method may further comprise determining whether a vehicle associated with a retrieved GPS track is in a STOP state, an IDLING state, or a JOURNEY state. The fleet stay period of a cell represents the total length of time when any vehicle of the vehicle fleet shows up in that cell in a STOP state or an IDLING state. The classifying step implements a random forest algorithm to classify a recurrent stop into a depot, employee home, or other locations. The features used by the random forest algorithm include: the average number of stops per day; the mean and standard deviation of stop durations; the average cumulative stop duration per day; the percentage of overnight stops; an aspect ratio of a bounding box of a recurrent stop; a percentage of fleet vehicles that stop at least once in the recurrent stop; maximum and minimum stop durations; a mean density of stops per day; an/or a percentage of stops staring or ending in a specific time of the day. The method may further obtain a satellite image corresponding to a recurrent stop. The classifying step may also implement a convolutional neural network that classifies the recurrent stop into the plurality of categories based on the satellite image.

Another aspect of the present application is directed to a non-transitory storage medium storing an executable program that, when executed, causes a processor to execute the present method for identifying recurrent stops of a vehicle fleet having a plurality of vehicles.

Yet another aspect of the present application is directed to a system for identifying recurrent stops of a vehicle fleet having a plurality of vehicles. The system comprise a pre-processing module that retrieves historical GPS tracks of the vehicle fleet over a period of time, detects stops made by the vehicle fleet along travelled routes that are associated with the historical GPS tracks, constructs a coverage area that covers the travelled routes, and discretizes the coverage area into a plurality of cells; a detecting module that determines whether a cell is a recurrent stop based on a fleet stay period associated with that cell; and a classifying module that classifies a determined recurrent stop into a plurality of categories.

BRIEF DESCRIPTION OF THE DRAWINGS

The accompanying drawings are provided to illustrate embodiments of this disclosure, and, together with the detailed description, serve to explain principles of embodiments as set forth in the present application, in which.

DETAILED DESCRIPTION

It will be appreciated by those ordinarily skilled in the art that the foregoing brief description and the following detailed description are exemplary (i.e., illustrative) and explanatory of the subject matter as set forth in the present application, but are not intended to be restrictive thereof or limiting of the advantages that can be achieved by the present application in various implementations. Additionally, it is understood that the following detailed description is representative of some embodiments as set forth in the present application, and are neither representative nor inclusive of all subject matter and embodiments within the scope as set forth in the present application.

Figure 1:
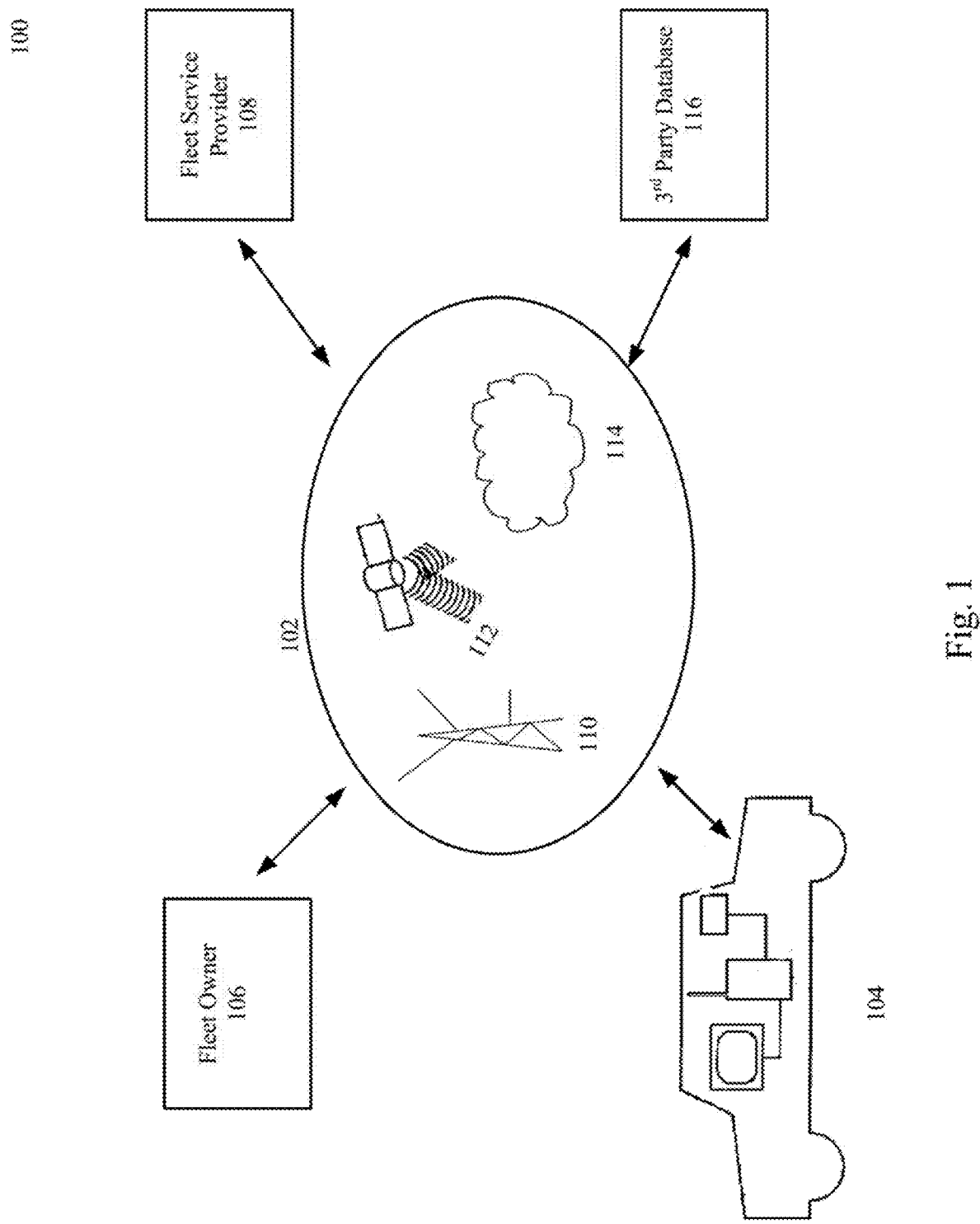
FIG. 1 illustrates a fleet service system according to an embodiment of the present application.

FIG. 1 illustrates a fleet service system for a fleet of vehicles according to an embodiment of the present application. The fleet service system 100 includes a fleet of vehicles 104 that belong to a fleet company or owner 106, a fleet service provider 108, and a $3^{rd}$ party database 116. To manage the fleet 104 efficiently, the fleet owner 106 relies on services provided by the fleet service provider 108, such as Fleetmatics, to manage the fleet 104. A fleet service provider 108 may provide services in driver scheduling, routing planning, vehicle tracking, vehicle maintenance, historical analysis, and etc. The $3^{rd}$ party database 116 may collect and integrate geographical information of an area to a map database and make those data available for the public to use. The communication among the fleet owner 106, the fleet 104, the fleet service provider 108, and the $3^{rd}$ party database is implemented via a communication network 102. In one example of the fleet service system 100, the company or fleet owner 106, such as a mid-size HVAC company, uses a fleet of vehicles 104 to transport equipment and technicians to multiple job sites and relies on mobile applications, such as Fleetmatics Work or Reveal, to schedule, track, and maintain the fleet of vehicles 104. The $3^{rd}$ party database 116 may be a GIS system that is managed by Google, which associates location information, such as coordinates and address, with other real life information, such as business name, distance, map, satellite images, street images, and etc. It is noted that the fleet of vehicles is not limited to a group of automobiles, but also includes water vessels, aircrafts, trains, and any other transportation means.

When a routing service of the fleet service provider 108 is used by the fleet owner 106, routes that cover a plurality of work orders may be planned offline. Sometime, the routes may be planned in real-time when additional stops need to be made. While in transit, the vehicle is guided by a plurality of satellites 112, which track the vehicle in real-time and on a regular basis. In some situations, the GPS tracks or traces are recorded and transmitted to the fleet service provider 108. In some situations, the GPS tracks or traces may be stored by the fleet owner or the company who operates the plurality of satellites. Regardless in which database the GPS traces are stored, these GPS traces may be available to a fleet service company to explore. The GPS traces of the vehicle are formed by a sequence of GPS records, each of which consists essentially of vehicle identification information, time stamp, longitude of the vehicle, and latitude of the vehicle. A few other data, such as altitude, speed, and acceleration of the vehicle, may be optionally determined by the plurality of satellites 112 and included in the GPS traces. The sampling rate of the GPS traces may be set to a fixed interval or may vary depending on vehicle moving conditions. Both the fleet owner 106 and the fleet service provider 108 store these GPS traces in their own databases.

In one embodiment, other information about the vehicle may be collected by the fleet service provider 108. For example, the fleet owner 106 may request the fleet service provider 108 to provide services for vehicle maintenance. Thus, the fleet service provider 108 may install a transmitting device on a vehicle of the fleet 104 to read event codes collected by vehicle's on-board computer and transmit these codes to the fleet service provider 108. The codes may reveal information about engine events and mileage, and may be known, for example, as OBD or OBDII codes. When the codes are available to the fleet service provider 108, they may be used to determine the running status of the vehicle, including engine on, engine off, speed, acceleration, and etc.

Figure 2:
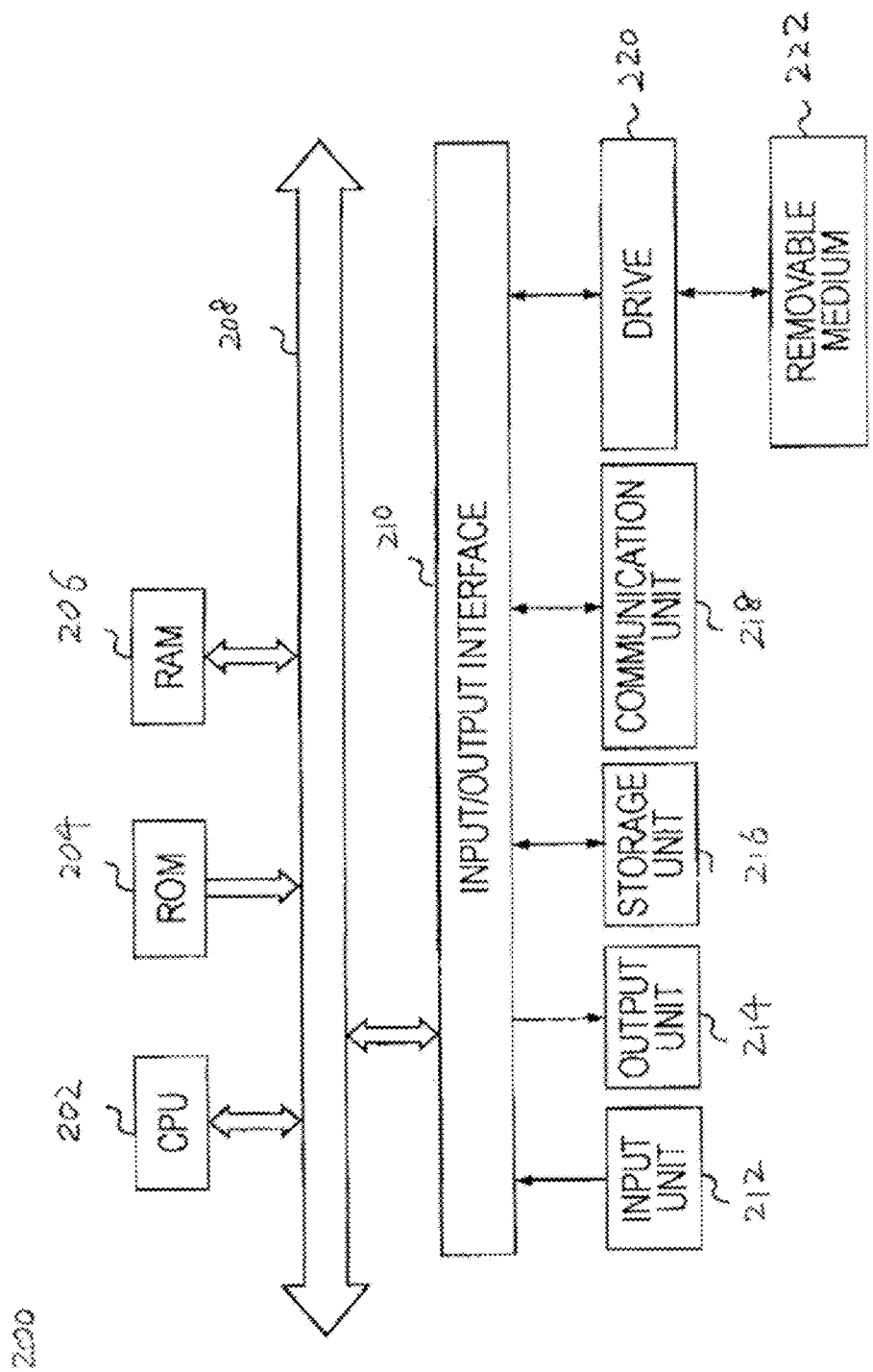
FIG. 2 illustrates a general structure of a computing system according to an embodiment of the present application.

FIG. 2 illustrates a general structure of an electronic computing device that may be used by the fleet owner 106 and the fleet service provider 108 for communication, management, computing, information storage, and data processing. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A non-transitory storage medium 222, sometimes removable, may be formed of a magnetic disk, an optical disc, a magneto-optical disc, flash or EEPROM, SDSC (standard-capacity) card (SD card), or a semiconductor memory. The medium 222 is loaded as appropriate into the drive 220. The drive 220 reads data recorded on the medium 222 or records predetermined data on the removable medium 222.

An operating system such as Microsoft Windows 7®, Windows XP® or Vista™ Linux®, Mac OS®, or Unix® may be used by the device 200. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

According to an embodiment of the present application, the system, method, algorithm, step, and process as disclosed in the present application may be implemented as hardware, software, or both. When the algorithm and process are implemented as software, such as an executable program, the algorithm and process are stored in the medium 222. The general structure as shown in FIG. 2 needs to be specifically configured to process the algorithm and process as disclosed in the present application. For example, the programs need to be installed in the device 200 and registered in the operation system. Thus, those individual instructions included in the programs transfer the exemplary structure from a general computer to a special designed device to execute the algorithm and process as disclosed in the present application.

Figure 3:
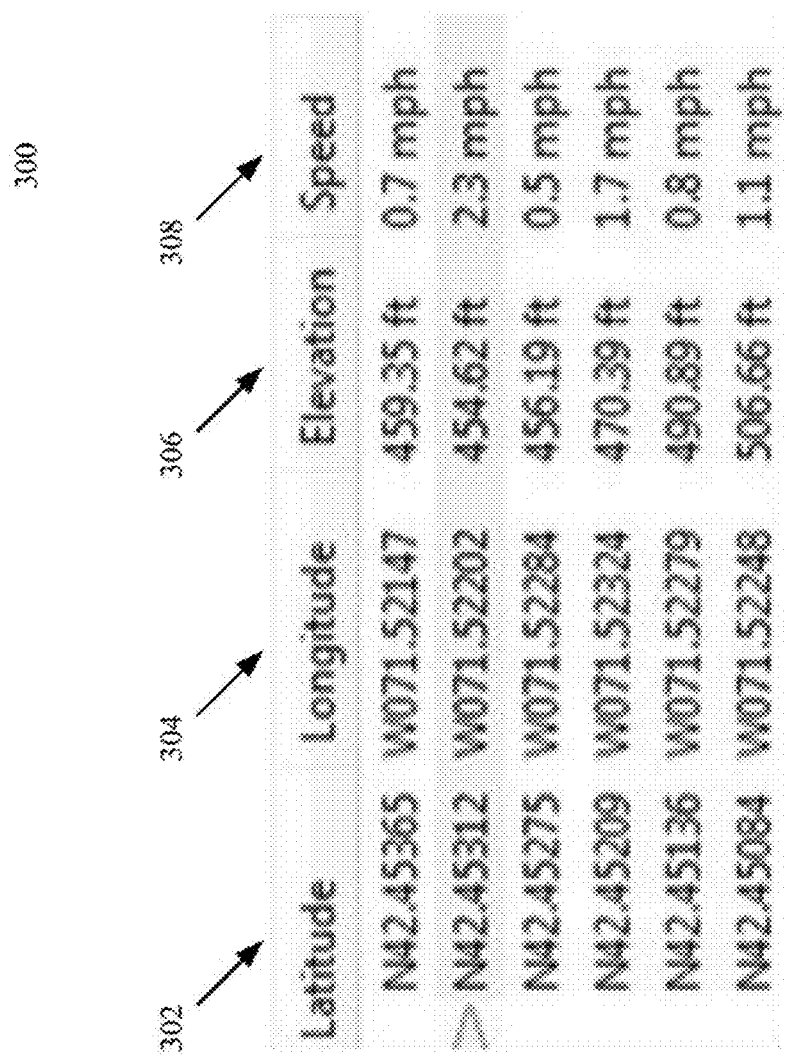
FIG. 3 illustrates a segment of a GPS track according to an embodiment of the present application.

FIG. 3 shows exemplary GPS tracks along a route travelled by a vehicle according to an embodiment of the present application. The position information, as indicated by latitude 302 and longitude 304, is collected periodically, such as every second or every minute. In addition, elevation 306 and speed 308 of the vehicle are also collected. The latitude 302 and longitude 304 as shown in FIG. 3 include digits up to the fifth decimal place. Sometime, the number of decimal places used in the latitude or longitude may be even greater depending on the accuracy requirement of the positions. For general commercial applications, such as tracking vehicle fleets, the fifth decimal place can provide position resolution of about 1 meters, which would satisfy most tracking requirements. In addition, the GPS tracks also include time stamps (not shown in FIG. 3) and vehicle ID (not shown in FIG. 3). According to an embodiment of the present application, the historical GPS tracks of a vehicle is used to determine a plurality of engine events, such as engine on, engine off, idling start, idling end, and etc. These engine events are subsequently used to determine a plurality operational states of the vehicle, such as STOP state, IDLING state, and JOURNEY state.

Figure 4:
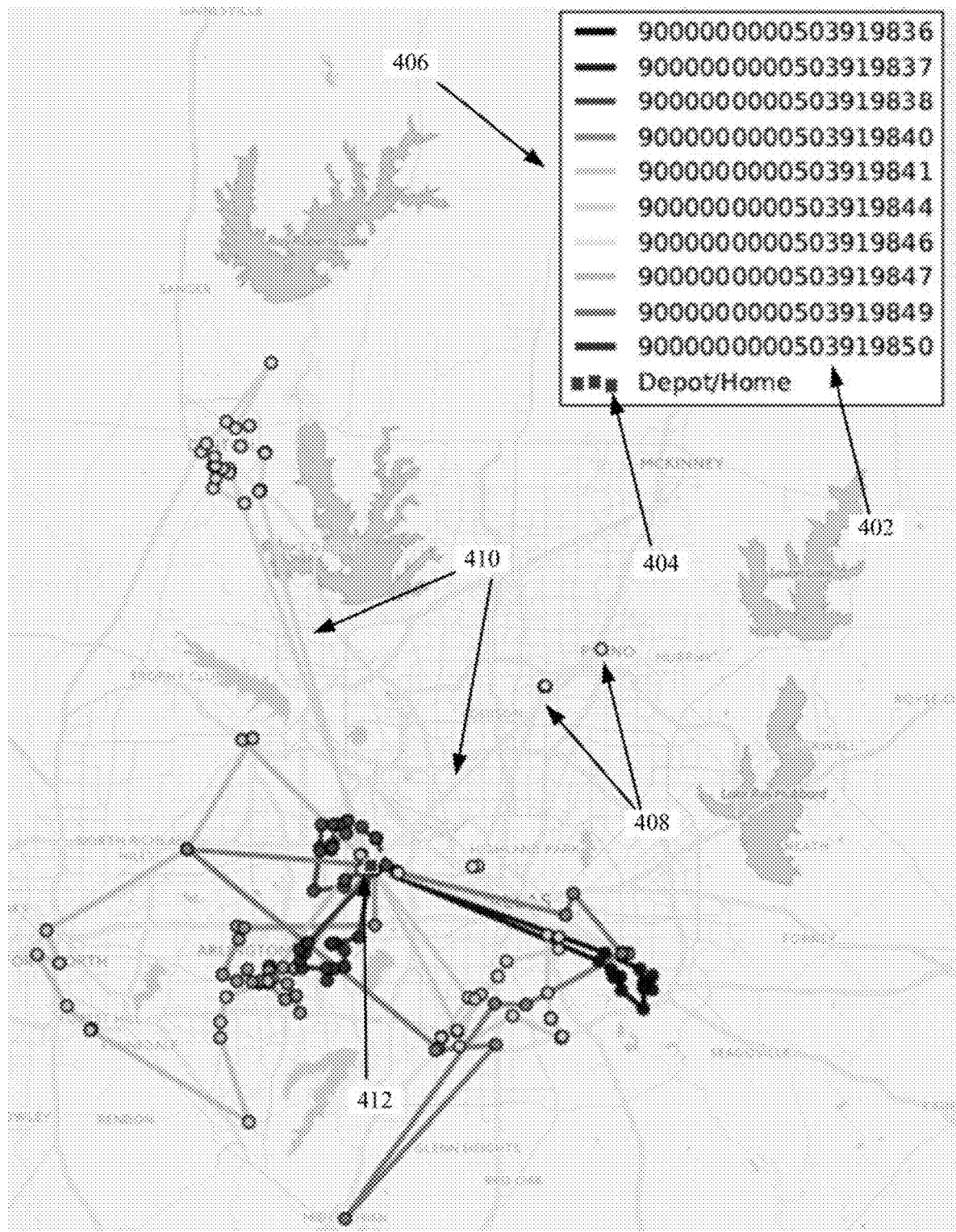
FIG. 4 illustrates a map showing routes travelled by a vehicle fleet according to an embodiment of the present application.

FIG. 4 illustrates a map showing routes travelled by a vehicle fleet during a period of time according to an embodiment of the present application. As shown in FIG. 4, the vehicle fleet has nine vehicles 402, each having a unique ID, such as 90000000503919836, 90000000000503919850, which is shown in a legend box 406. The legend box 406 also shows a symbol for frequent stops 404. The period of time that covers the routes shown in the map of FIG. 4 is 8 hours, which is the length of a normal work shift. Each vehicle of the fleet makes a plurality of stops 408 that are connected by a plurality of traveled routes 410. These stops 408 may be work order stops, fueling stops, service stops, lunch stops, home stops, and depot stops, The depot stop 412 as shown in FIG. 4 represents a significant location, such as an administrative office or a warehouse, where all vehicles of the fleet frequently visit to pick up work orders. Other stops, such as home stops or service stops, also have major impacts in managing the fleet. Vehicles of the fleet usually visit these stops more often than other stops. Thus, these stops may have a general name as recurrent stops of hot-spots. According to an embodiment of the present application, the disclosed system and method detect these hot-spots based on the historical GPS data of a vehicle fleet and then classifies these stops into a plurality of categories, such as a depot, an employee home, a service station, or any other significant locations.

Figure 5:
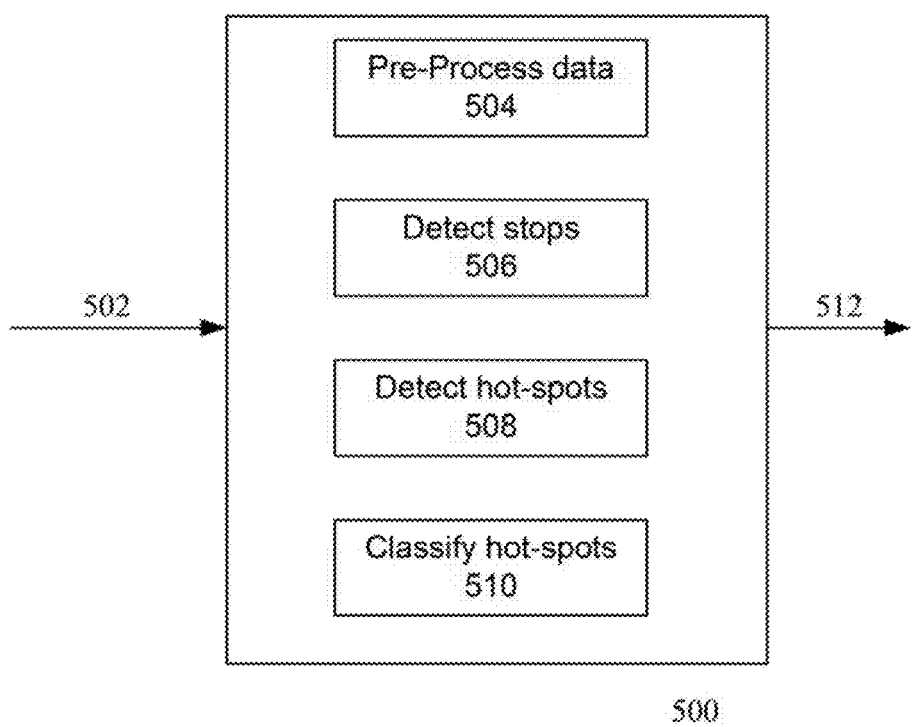
FIG. 5 illustrates a system for detecting and classifying hot-spots of a vehicle fleet according to an embodiment of the present application.

FIG. 5 illustrates a system 500 for automatically identifying and classifying hot-spots for a vehicle fleet according to an embodiment of the present application. Input 502 of the system 500 includes a plurality of historical GPS tracks and other data related to the GPS tracks. For example, the other data may include cartographical data obtained from a $3^{rd}$ party. The cartographical data corresponds to the area covered by the GPS tracks and may include satellite image, address, description of business operations, and traffic situation. In one embodiment, the input 502 may also include OBD codes collected by vehicle on-board computers. The output 512 of the system 500 may include the position and classification of detected hot-spots. The system 500 includes a pre-processing module 504 that processes the input 502, such as the GPS tracks, to detect engine events and classify operating states of a vehicle, a detecting module 506 that detects all stops made by the vehicle, a detecting module 508 that detects hot-spots of a vehicle fleet, and a classifying module 510 that classifies the detected hot-spots into a plurality of categories. In one embodiment, the system 500 may be a single device, such as a computer, that has the functional modules 504, 506, 508, and 510. In another embodiment, the system 500 may be formed by a plurality of computers or processors, each of which corresponds to a functional module shown in FIG. 5.

Figure 6:
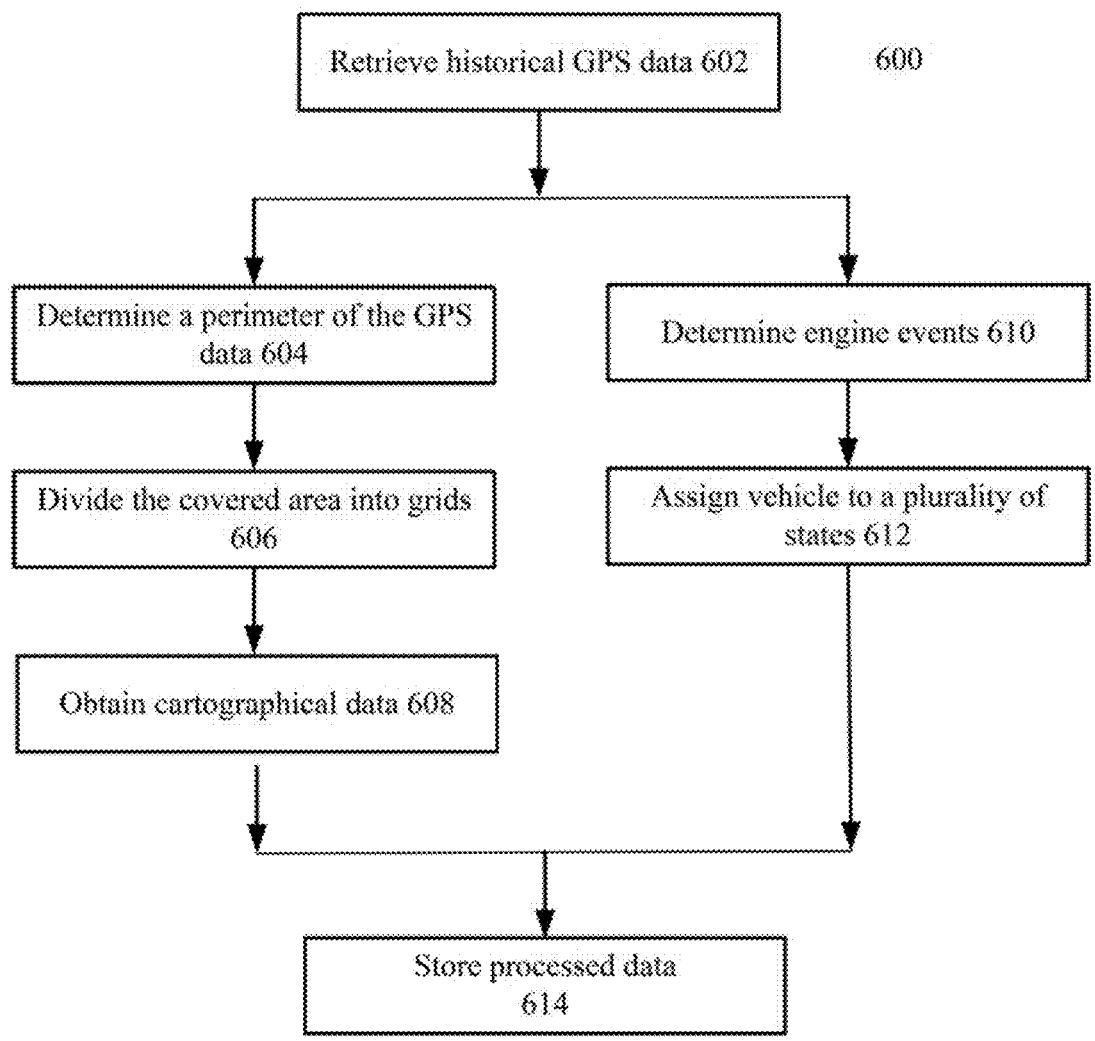
FIG. 6 illustrates a method of processing the GPS tracks according to an embodiment of the present application.

FIG. 6 illustrates a method of pre-processing the GPS data according to an embodiment of the present application. The method 600 may be used by the pre-processing module 504 to process the historical GPS tracks such that information relevant to the subsequent hot-spot detection and classification is extracted. At step 602, the historical GPS data of a vehicle fleet is retrieved from a database. In one embodiment, the retrieved historical GPS data preferably includes those GPS tracks corresponding to every vehicle of the fleet. But, the present application is not limited to retrieve historical GPS data of the entire fleet. In one embodiment, the retrieved historical GPS data includes only those vehicles that are routinely used for business or those whose usage is representative of the vehicle fleet. The period that covers these historical GPS data may be just one work shift, such as eight hours, or may be a plurality of work shifts, such as 10, 16, 20, 30, or 40 hours. The period that covers the retrieved GPS tracks may be selected based on the business characteristics of a vehicle fleet. For example, for home services, the period may be set to one day. For parcel deliveries, the period may be set to one week. For interstate moving services, the period may be set to one month. In one embodiment, the historical GPS tracks may be retrieved over multiple periods to increase the accuracy of the detection and classification.

The retrieved historical GPS data 604 may be used to obtain at least two categories of relevant information. One category of information may be understood as cartographical data, which may be obtained through steps 604-608. At step 604, the method 600 determines an area that covers all travelled routes associated with these historical GPS tracks. The area may have any shape that is suitable to be processed by a computer. In one embodiment, step 604 first looks for the maximum values of latitude and longitude and the minimum values of the latitude or longitude. Then, step 604 uses the maximum and minimum values to form four coordinates representing four corners of a rectangular area, which may be understood as a bounding box that covers all the retrieved GPS tracks. In another embodiment, stop 604 may find mean values of the longitude and latitude of the retrieved GPS tracks and then use a radius together the mean values to define a circular area that covers all the retrieved GPS tracks. According to a preferred embodiment of the present application, a rectangular area is used because it is easy to be discretized into a plurality of cells. After the area is determined, step 606 divides or discretizes that area into a plurality of cells. The size of these cells is determined by a threshold, also known as discretization step. For example, the discretization step may be set based on the unit of the latitude or longitude, such as 0.0001 degree, 0.0005 degree, 0.001 degree, 0.015 degree, or 0.002 degree. It is noted that a discretization step of 0.001 degree generates cells of about 100 meters. A discretization step of 0.0001 degree generates cells of about 10 meters. For locations related to a vehicle fleet, a discretization step of 0.001 degree may be adequate because it is about the size of the parking space surrounding a depot or a residential home. At step 608, cartographical information corresponding to the area is obtained. The cartographical information may include satellite images, address, business description, and traffic information.

Another category of information that may be obtained from the retrieved GPS tracks through steps 610 and 612 may include operation information of individual vehicles in the fleet, including engine events and operating states of vehicles. Based on the speed and time stamp of the GPS tracks, a plurality of engine events of a corresponding vehicle may be inferred at step 610. These engine events include engine on in which the engine is started, engine off in which the engine is shut off, idling start in which the speed of the vehicle is lowered below a threshold but the engine is on, and idling end in which the speed of the vehicle raises above a threshold. In one embodiment, OBD codes are also used to determine the engine events. After these engine events are inferred, the vehicle is assigned a plurality of operating states at step 612, including a STOP state in which the vehicle is between an engine off event and an engine on event, an IDLING STATE in which the vehicle is between an idling start event and an idling end event, and a JOURNEY state in which the vehicle has an engine on event and is not in an IDLING state. All the data retrieved and generated by the method 600 is stored in a memory at step 614.

Figure 7A:
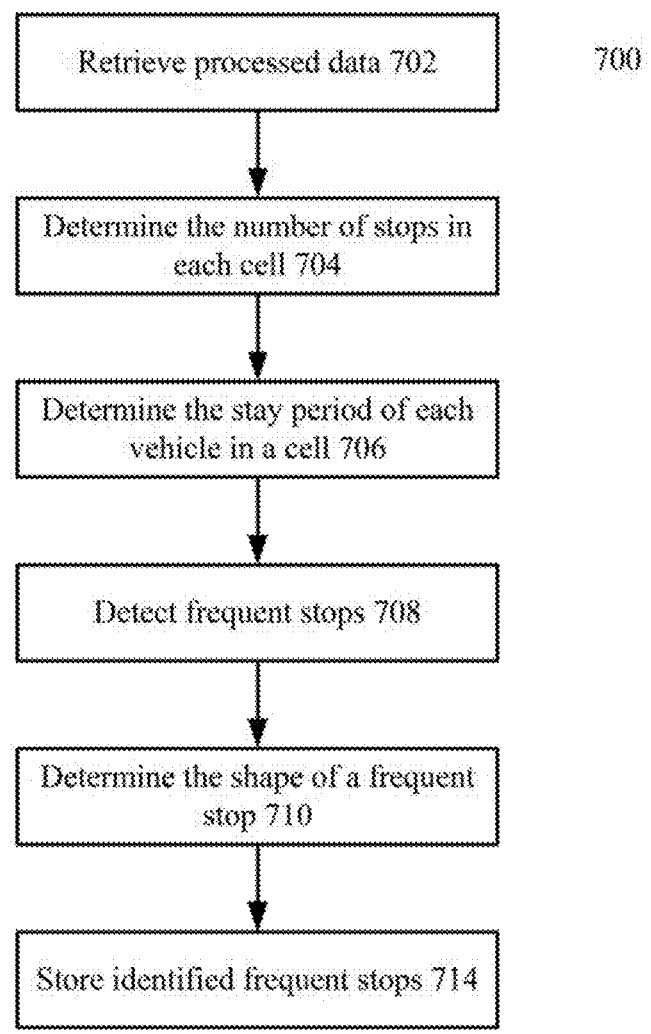
FIG. 7a illustrates a method of detecting hot-spots of a vehicle fleet according to an embodiment of the present application.

FIG. 7a illustrates a method of detecting frequent stops of a vehicle fleet according to an embodiment of the present application. The method 700 first detects all stops along the travelled routes, regardless whether they are hot-spots or not, from the retrieved GPS tracks, determines which stop is a hot-spot, and then further refines the shape of the detected hot-spot. At step 702, the method 700 retrieves those data saved at step 614. At step 704, the method 700 determines that the vehicle makes a stop as long as the vehicle is in a STOP state. In an embodiment, a stop is determined as long as the vehicle is in a STOP state or an IDLING state. When a stop is determined, the associated vehicle ID, position information, time stamps, and duration are also obtained from the GPS tracks. After the stops of all vehicles are detected, the step 704 further tallies the number of stops of the vehicle fleet in each cell that is previously generated at step 606 of FIG. 6. This technique may also be known as a grid-based cluster algorithm. At step 706, the fleet stay period of a cell is calculated. The fleet stay period of a cell represents the total length of time of all vehicles in the fleet when they stop in the cell. At step 708, a cell is determined to be a recurrent stop or a hot-spot when its fleet stay period is greater than a pre-determined threshold. In one embodiment, the fleet stay period of a cell includes all period when vehicles show up in that cell with a STOP state or an IDLING state. As an outcome of step 708, a plurality of cells may be detected as recurrent stops. The plurality of detected recurrent stops may not reflect the actual size or shape of the physical location, especially when a significant location associated with the recurrent stops is greater than the size of individual cells. For example, a parking facility of a vehicle fleet may be half mile (about 800 meters) long and half mile (about 800 meters) wide, whose area covers many cells.

Thus, at step 710, the plurality of detected recurrent stops are further analyzed to better reflect the actual situation. In one embodiment, all adjacent recurrent stops are merged into a single recurrent stop that is represented by a new rectangular box covering all the adjacent stops. The new rectangular box represents the smallest bounding box containing all stops inside the merged recurrent stops. In an embodiment, cells that are determined to be recurrent stops and are adjacent to each other horizontally, vertically, or diagonally may be merged to one single recurrent stop. After adjacent cells are merged, the newly formed recurrent stops are further checked to determine whether any overlap occurs. When an overlap occurs between merged recurrent stops, the overlapped recurrent stops are then merged again to form a new recurrent stop.

Figure 7F:
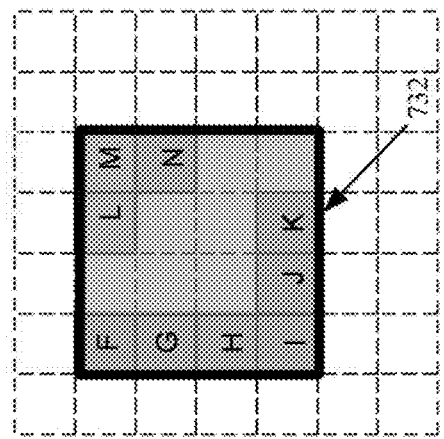
FIG. 7f illustrates a hot-spot formed by merging hot-spots of FIG. 7e.
Figure 7C:
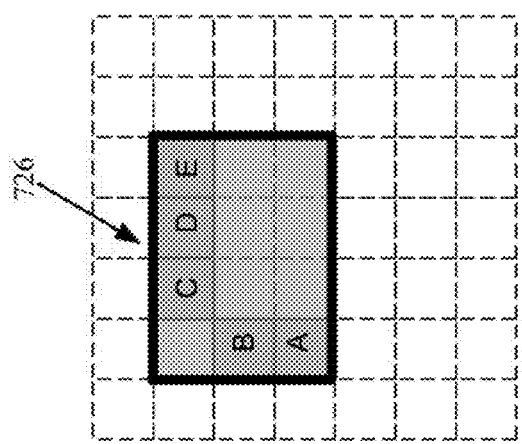
FIG. 7c illustrates a hot-spot formed by merging the hot-spots of FIG. 7b.
Figure 7E:
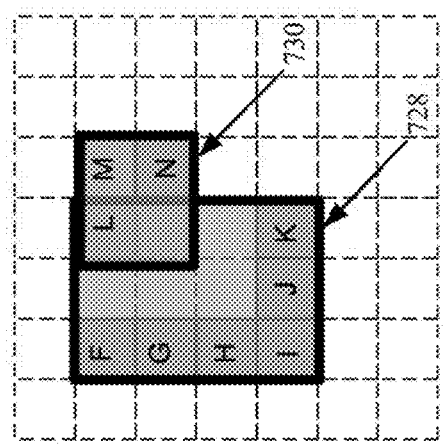
FIG. 7e illustrates hot-spots formed by merging the hot-spots of FIG. 7d.
Figure 7B:
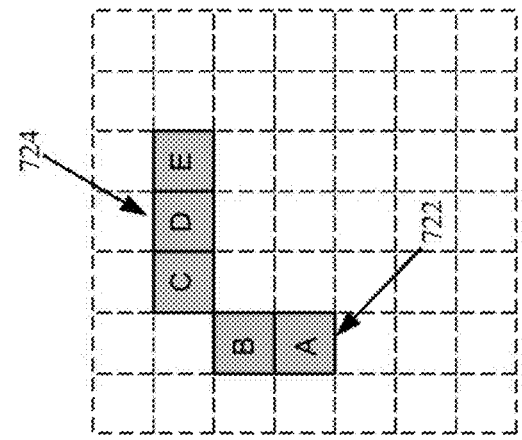
FIG. 7b illustrates a few detected hot-spots according to an embodiment of the present application.

FIGS. 7b-7f illustrate a few examples of recurrent stops formed by step 710 according to an embodiment of the present application. As shown in FIG. 7b, cells A, B, C, D, and E represent a plurality of discretized cells that are detected as recurrent stops. Cells A and B are adjacent to each other and are vertically merged to form a first recurrent stop 722. Cells C, D, and E are horizontally adjacent to each other and are merged to form a second recurrent stop 724. The recurrent stops 722 and 724 are diagonally adjacent to each other and are merged to form a third recurrent stop 726 as shown in FIG. 7c. The third recurrent stop 726 includes not only cells A, B, C, D, and E, but also a plurality to other cells that are not originally detected as recurrent stops.

Figure 7D:
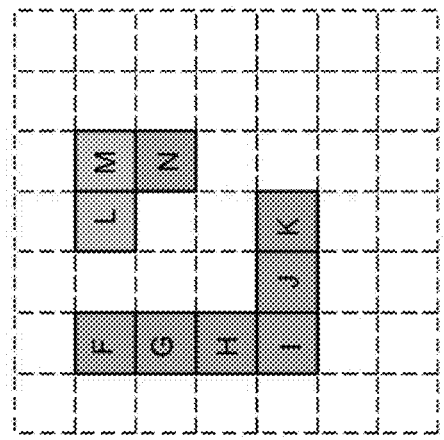
FIG. 7d illustrates a few detected hot-spots according to an embodiment of the present application.

As shown in FIG. 7d, cells F, G, H, I, J, K, L, M, and N are originally detected as recurrent stops. Cells F, G, H, I, J, K are adjacent to each other, either horizontally or vertically, and are merged as a new recurrent stop 728 as shown in FIG. 7e. Cells L, M, and N are adjacent to each other, either horizontally or vertically, and are merged as a new recurrent stop 730 as shown in FIG. 7e. The recurrent stops 728 and 730 overlap with each other and are subsequently merged as a new recurrent stop 732 as shown in FIG. 7f The new recurrent stop 732 includes a few additional cells that are not originally detected as recurrent stops. The examples shown in FIGS. 7b-7f correspond to situations whether the actual recurrent stop represents a depot that covers several discretized cells. The processing of step 710 is believed to make the detected recurrent stops to follow the actual location more accurately.

At step 714, the method 700 stores relevant information about identified recurrent stops in a memory. The relevant information includes the coordinates of a recurrent stop, number of stops and fleet stay period associated with a recurrent stop, and information of each stop of a recurrent stop.

In a work example of the present application, a threshold for the fleet stay period in a recurrent stop is set to eight hours. This threshold may be adjusted depending on the fleet size, characteristics of the business operation, the cell size, and the period of the retrieved GPS tracks. In addition, a 0.001 degree for both latitude and longitude is used as the discretization threshold, which creates a cell size of about 100 meters.

Figure 8:
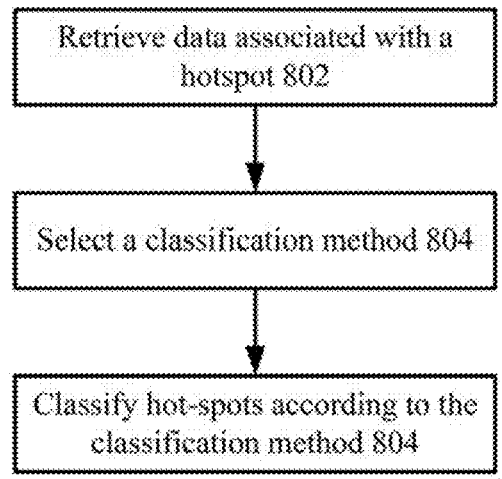
FIG. 8 illustrates a method for classifying the hot-spots of a vehicle fleet according to an embodiment of the present application.

FIG. 8 illustrates a method of classifying recurrent stops of a vehicle fleet according to an embodiment of the present application. In general, the method 800 classifies the recurrent stops into a plurality of categories, which gives a recurrent stop more specific meaning and importance. Without further processing, the recurrent stops detected by the method 700 would not reveal any particular meaning to a user other than a location which vehicles visit very often. The classification method 800 is capable of assigning the recurrent stops into any one of the following categories: a depot, a service location, an administrative office, a home, a fuel stop, or a lunch stop. At step 802, the method 800 first retrieves relevant data, such as GPS tracks and those detected recurrent stops at step 714. In one embodiment, step 802 also obtains satellite images of a detected recurrent stop and obtains point of interests information that is within the proximity of the recurrent stop. The proximity may correspond to an area that is within walking distance from the stop. At step 804, the method 800 selects a classification method. A plurality of classification methods may be available to the method 800. In one embodiment, the classification methods may be selected based on the type of data to be used for classification. If a satellite image is the basis for classifying a recurrent stop, then a convolutional neural network may be used as the classification method. If the retrieved GPS tracks and stops information derived from these GPS tracks are used for classifying a recurrent stop, then a random forest algorithm may be selected as a classification method.

In one embodiment, step 804 selects more than one classification methods to improve the accuracy of the classification. When a plurality of classification methods are used, the plurality of classification methods may work independently from each other. For example, each classification method may classify the same recurrent stop separately, and then all the classifying results may be aggregated and analyzed statistically to produce a combined classification result. Alternatively, the plurality of classification methods may be combined and work cooperatively with each other. For example, the classification results of one classification method may be used as a feature of another classification method. In one implementation, the convolutional neural network may classify a recurrent stop based on a satellite image. Then, the classification results of the convolutional neural network is used as a feature or a set of features for the random forest algorithm, which uses both features computed from the GPS tracks and those features corresponding to the classification results of the convolutional neural network for both training and prediction.

At step 806, the method 800 classifies the detected recurrent stops according to the selected classification method.

According to an embodiment, the method 800 classifies a recurrent stop by applying a supervised machine learning algorithm to GPS tracks and information of individual stops of a recurrent stop. A supervised machine learning algorithm uses a plurality of features to classify a recurrent stop to a plurality of categories. A feature used by a machine learning algorithm may be understood as a mathematical expression indicating a characteristic of a recurrent stop. A machine learning algorithm takes many features as input and output a classification indicating a category of the recurrent stop.

According to an embodiment, the method 800 uses the following features for the classification:

The average number of stops per day;

The percentage of fleet vehicles that stop at least once in the recurrent stop;

The mean and standard deviation of stop durations;

The maximum and minimum stop duration;

The average cumulative stop duration that day;

The percentage of overnight stops;

The area and aspect ratio of the bounding box;

The mean density of stops per day;

The percentage of stops staring or ending in a specific time of the day (e.g., from 5 AM to 2 PM, and from 2 PM to 11 PM).

In one embodiment, the supervised machine learning algorithm is a multi-class random forest algorithm. The random forest algorithm is first trained on a training dataset, which includes recurrent stops with manually-labeled classifications. The training dataset helps the random forest algorithm to establish model parameters of the algorithm. Once the random forest algorithm is trained, it can be used to make predictions based on new sets of recurrent stops.

According to an embodiment, the method 800 classifies a recurrent stop by applying a convolutional neural network to a satellite image of a recurrent stop. It has been known that a convolutional neural network is suitable for image recognition. In general, a convolutional neural network takes a 3D image blocks as neurons and then processes these image blocks through a plurality of functions, known as layers, including a convolutional layer for identifying spatial relationships among the input image blocks, a pooling layer for reducing the spatial size and the amount of parameters of the network, and a fully connected layer for integrating all connections with previous neurons and outputting an evaluation score for a plurality of classes. A basic introduction of a convolutional neural network may be found at http://cs231n.github.io/convolutional-networks/. Similar as the random forest algorithm, the convolutional neural network needs to be trained with a training set, which is a set of satellite images of recurrent stops that have known categories. The trained convolutional neural network then analyzes a satellite image of a recurrent stop (which needs to have the same zoom level as the training set) to classify that recurrent stop. According to an embodiment of the convolutional neural network of the present application, the satellite image is input to several convolutional blocks, each having the following layers and operations:

a convolutional layer with multiple channels as those described in A. Krizhevsky et al., Imagenet Classification with deep convolutional neural networks, *Advance in neural information processing systems*, pp. 1097-1105, 2012, the entirety of which is incorporated herein by reference;

a non-linearity in the form of a Parametric Rectified Linear Unit as those described in K. He, et al., Delving deep into rectifiers: Surpassing human level performance on imagenet classification, *Proceedings of the IEEE International Conference on Computer Vision*, pp. 1026-1034, 2015, the entirety of which is incorporated herein by reference; and a max-pooling layer.

The output of the last convolutional block is flattened and fed to a fully connected layer, following by a soft-max layer with a plurality of nodes. In an implementation, the plurality of nodes are one for each of the recognized categories, among e.g. depot, service location, administrative office, home, fuel stop, or lunch stop.

According to an embodiment, the method 800 not only uses information within a recurrent stop, but may also use information of adjacent cells, including point of interests, such as the presence or absence of shops, schools, service stations, restaurants, and hotels. The method 800 may also use satellite images of adjacent cells for classification.

The system and method as disclosed in the present application are capable of accommodating to a growing number of categories as long as then can be identified through a training set. For example, the plurality of categories to identify a recurrent stop may further include hotel stops. The present system and method also avoid the split of a large hot-spot by the merging process of adjacent recurrent stops. The present system and method also set up a linear relationship between the number of stops and the computing time, which makes the system and method scalable according to the amount of retrieved data.

The phrase "an embodiment" as used herein does not necessarily refer to the same embodiment, though it may. In addition, the meaning of "a," "an," and "the" comprise plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for identifying recurrent stops of a vehicle fleet having a plurality of vehicles, comprising:

retrieving, by a device, historical GPS tracks of the vehicle fleet over a period of time, wherein the device comprises one or more processors;

detecting, by the device, stops made by the vehicle fleet along travelled routes that are associated with the historical GPS tracks;

constructing, by the device, a coverage area that covers the travelled routes;

discretizing, by the device, the coverage area into a plurality of cells;

determining, by the device, whether a cell is a first recurrent stop based on a fleet stay period associated with the cell, wherein the fleet stay period is determined by:

tallying a quantity of total stops by the plurality of vehicles in the cell, and calculating a fleet stay period from a total length of time of the plurality of vehicles stopped in the cell;

determining, by the device, whether an adjacent cell, of the plurality of cells, is a second recurrent stop based on a fleet stay period associated with the adjacent cell;

merging, by the device, the cell with the adjacent cell to form a merged single recurrent stop from the first recurrent stop and the second recurrent stop; and classifying, by the device, the merged single recurrent stop into a plurality of categories.

2. The method of claim 1, wherein the period of time includes a plurality of work shifts.

3. The method of claim 1, wherein the cell has a size of about 100 meters.

4. The method of claim 1, further comprising:
determining whether a vehicle associated with a retrieved GPS track is in a STOP state, an IDLING state, or a JOURNEY state.

5. The method of claim 4, wherein the fleet stay period of a cell is a total length of time when any vehicle of the vehicle fleet shows up in the cell in a STOP state or an IDLING state.

6. The method of claim 1, wherein the classifying implements a random forest algorithm to classify a recurrent stop into a depot, an employee home, or other locations.

7. The method of claim 6, wherein features used by the random forest algorithm include:
an average number of stops per day;
mean and standard deviations of stop durations;
an average cumulative stop duration per day; and
a percentage of overnight stops.

8. The method of claim 7, wherein the features further include:
an aspect ratio of a bounding box of a recurrent stop;
a percentage of fleet vehicles that stop at least once in the recurrent stop;
maximum and minimum stop durations;
a mean density of stops per day; and
a percentage of stops staring or ending in a specific time of the day.

9. The method of claim 1, further comprising obtaining a satellite image corresponding to a recurrent stop,
wherein the classifying implements a convolutional neural network that classifies the recurrent stop into the plurality of categories based on the satellite image.

10. The method of claim 1,
wherein the classifying combines a random forest algorithm and a convolutional neural network to classify a recurrent stop,
the random forest algorithm using a plurality of computed features to classify the recurrent stop, and
the convolutional neural network using a satellite image to classify the recurrent stop, and
wherein a classification result of the convolutional neural network is included in the plurality of computed features used by the random forest algorithm.

11. A non-transitory storage medium storing an executable program that, when executed by a processor, causes the processor to:
retrieve historical GPS tracks of a vehicle fleet, comprising a plurality of vehicles, over a period of time;
detect stops made by the vehicle fleet along travelled routes that are associated with the historical GPS tracks;
construct a coverage area that covers the travelled routes;
discretize the coverage area into a plurality of cells;
determine whether a cell is a first recurrent stop based on a fleet stay period associated with the cell,
wherein the fleet stay period is determined by:
tallying a quantity of total stops by the plurality of vehicles in the cell, and
calculating the fleet stay period from a total length of time of the plurality of vehicles stopped in the cell;
determine whether an adjacent cell, of the plurality of cells, is a second recurrent stop based on a fleet stay period associated with the adjacent cell;
merge the cell with the adjacent cell to form a merged single recurrent stop from the first recurrent stop and the second recurrent stop; and
classify the merged single recurrent stop into a plurality of categories.

12. The non-transitory storage medium of claim 11, wherein the period of time includes a plurality of work shifts.

13. The non-transitory storage medium of claim 11, wherein the cell has a size of about 100 meters.

14. The non-transitory storage medium of claim 11, wherein the executable program further causes the processor to:
determine whether a vehicle associated with a retrieved GPS track is in a STOP state, an IDLING state, or a JOURNEY state.

15. The non-transitory storage medium of claim 14, wherein the fleet stay period of a cell is a total length of time when any vehicle of the vehicle fleet shows up in the cell in a STOP state or an IDLING state.

16. The non-transitory storage medium of claim 11, wherein the executable program, when causing the processor to classify, causes the processor to:
implement a random forest algorithm to classify a recurrent stop into a depot, an employee home, or other locations.

17. The non-transitory storage medium of claim 16, wherein features used by the random forest algorithm include:
an average number of stops per day;
mean and standard deviations of stop durations;
an average cumulative stop duration per day; and
a percentage of overnight stops.

18. The non-transitory storage medium of claim 17, wherein the features further include:
an aspect ratio of a bounding box of a recurrent stop;
a percentage of fleet vehicles that stop at least once in the recurrent stop;
maximum and minimum stop durations;
a mean density of stops per day; and
a percentage of stops staring or ending in a specific time of the day.

19. The non-transitory storage medium of claim 11, wherein the executable program further causes the processor to:
obtain a satellite image corresponding to a recurrent stop,
wherein, the executable program, when causing the processor to classify, causes the processor to:
implement a convolutional neural network that classifies the recurrent stop into the plurality of categories based on the satellite image.

20. A device comprising:
a memory; and
a processor, communicatively coupled to the memory, to:
retrieve historical GPS tracks of a vehicle fleet, comprising a plurality of vehicles, over a period of time,
detect stops made by the vehicle fleet along travelled routes that are associated with the historical GPS tracks,
construct a coverage area that covers the travelled routes,
discretize the coverage area into a plurality of cells,
determine whether a cell is a first recurrent stop based on a fleet stay period associated with the cell, wherein the fleet stay period is determined by:
   tallying a quantity of total stops by the plurality of vehicles in the cell, and
   calculating the fleet stay period from a total length of time of the plurality of vehicles stopped in the cell;

determine whether an adjacent cell, of the plurality of cells, is a second recurrent stop based on a fleet stay period associated with the adjacent cell;

merge the cell with the adjacent cell to form a merged single recurrent stop from the first recurrent stop and the second recurrent stop, and classify a the merged single recurrent stop into a plurality of categories.

\* \* \* \* \*